United States Patent
Yamaga et al.

(10) Patent No.: US 11,264,155 B2
(45) Date of Patent: Mar. 1, 2022

(54) EPSILON-TYPE IRON OXIDE MAGNETIC PARTICLES AND METHOD FOR PRODUCING THE SAME, MAGNETIC POWDER, MAGNETIC COATING MATERIAL AND MAGNETIC RECORDING MEDIUM CONTAINING MAGNETIC PARTICLES

(71) Applicant: DOWA ELECTRONICS MATERIALS CO., LTD., Tokyo (JP)

(72) Inventors: Kazuhiro Yamaga, Tokyo (JP); Tetsuya Kawahito, Tokyo (JP); Toshihiko Ueyama, Tokyo (JP); Kenji Sakane, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 250 days.

(21) Appl. No.: 16/337,195

(22) PCT Filed: Sep. 29, 2017

(86) PCT No.: PCT/JP2017/035460
§ 371 (c)(1),
(2) Date: Mar. 27, 2019

(87) PCT Pub. No.: WO2018/062478
PCT Pub. Date: Apr. 5, 2018

(65) Prior Publication Data
US 2019/0228889 A1 Jul. 25, 2019

(30) Foreign Application Priority Data
Sep. 30, 2016 (JP) .............................. JP2016-193889

(51) Int. Cl.
*H01F 1/11* (2006.01)
*C01G 49/06* (2006.01)
(Continued)

(52) U.S. Cl.
CPC ............... *H01F 1/11* (2013.01); *C01G 49/00* (2013.01); *C01G 49/06* (2013.01); *G11B 5/706* (2013.01);
(Continued)

(58) Field of Classification Search
CPC ................................ C01G 49/00; C01G 49/06
See application file for complete search history.

(56) References Cited

U.S. PATENT DOCUMENTS

2007/0059557 A1   3/2007   Shoji et al.
2010/0171066 A1*  7/2010   Ohkoshi .............. C01G 45/006
                                                         252/62.57

(Continued)

FOREIGN PATENT DOCUMENTS

JP     10-269570    10/1998
JP     2007-81227    3/2007

(Continued)

OTHER PUBLICATIONS

International Search Report issued in International Patent Application No. PCT/JP2017/035460, dated Nov. 21, 2017.

(Continued)

Primary Examiner — Alexandre F Ferre
(74) Attorney, Agent, or Firm — Greenblum & Bernstein, P.L.C.

(57) ABSTRACT

An object of the present invention is to provide a magnetic powder having a narrow particle size distribution of epsilon-type iron oxide particles, and another object is to provide magnetic powder suitable for magnetic recording medium by improving particle size distribution, and provide epsilon-type iron oxide magnetic particles and related technologies in which a number average particle diameter of major diameters ($D_{50}$) is 10 to 20 nm, a 90% cumulative particle diameter ($D_{90}$) is 30 nm or less, and a geometric standard (Continued)

deviation ($\sigma_g$) of major diameters is 1.45 or less, which are obtained by TEM observation.

11 Claims, 3 Drawing Sheets

(51) Int. Cl.
*G11B 5/842* (2006.01)
*G11B 5/714* (2006.01)
*G11B 5/706* (2006.01)
*C01G 49/00* (2006.01)
*B82Y 25/00* (2011.01)

(52) U.S. Cl.
CPC .............. *G11B 5/714* (2013.01); *G11B 5/842* (2013.01); *B82Y 25/00* (2013.01); *C01P 2004/04* (2013.01); *C01P 2004/32* (2013.01); *C01P 2004/54* (2013.01); *C01P 2004/64* (2013.01); *C01P 2006/42* (2013.01)

(56) References Cited

U.S. PATENT DOCUMENTS

| | | | |
|---|---|---|---|
| 2010/0238063 A1* | 9/2010 | Ohkoshi | ............ C01G 49/0045 342/1 |
| 2017/0162220 A1 | 6/2017 | Nakashio et al. | |
| 2017/0287516 A1 | 10/2017 | Sakane et al. | |
| 2018/0005737 A1 | 1/2018 | Sakane et al. | |

FOREIGN PATENT DOCUMENTS

| | | |
|---|---|---|
| JP | 2009-224414 | 10/2009 |
| JP | 2014-154177 | 8/2014 |
| JP | 2016-130208 | 7/2016 |
| JP | 5966064 | 8/2016 |
| WO | 2015/198514 | 12/2015 |

OTHER PUBLICATIONS

Written Opinion of the International Searching Authority issued in International Application No. PCT/JP2017/0035460, dated Nov. 21, 2017.

International Preliminary Report on Patentability dated Apr. 2, 2019.

\* cited by examiner

EPSILON-TYPE IRON OXIDE MAGNETIC PARTICLES AND METHOD FOR PRODUCING THE SAME, MAGNETIC POWDER, MAGNETIC COATING MATERIAL AND MAGNETIC RECORDING MEDIUM CONTAINING MAGNETIC PARTICLES

TECHNICAL FIELD

The present invention relates to epsilon-type iron oxide magnetic particles suitable for high density magnetic recording medium, radio wave absorber, etc., and particularly, to a powder having fine particles with reduced average particle size of about ten nanometers.

DESCRIPTION OF RELATED ART

Epsilon-type iron oxide magnetic particles are taken out as unique phases among several iron oxides, and cannot be stably taken out as a single phase for a long time. However, according to a research that has been done recently, the epsilon-type iron oxide magnetic particles can be taken out as a single phase, and come into spotlight as a unique magnetic material having a high coercive force.

In order to achieve high recording density in the field of magnetic recording, and in order to achieve miniaturization of each part in each electronic component using a magnetic material, miniaturization of the magnetic material is required. Particularly, a metal magnetic powder conventionally conceived and used has a problem that as particles become finer, degradation with time causes remarkable degradation of magnetic properties, and cannot meet the need for miniaturization.

In view of these current circumstances, the present inventors have developed magnetic materials that can be used for magnetic recording and found as follows. Among them, the epsilon-type iron oxide magnetic particles mentioned above express a specific coercive force (1600 kA/m or more) compared with conventionally known magnetic powder, and the coercive force can be arbitrarily adjusted depending on a substitution amount of an element that can substitute an iron site. Since it is possible to adjust the properties according to requirements, the degree of freedom on the material supplier side is large, and the epsilon-type iron oxide magnetic particles have been expected as the magnetic particles for next generation magnetic recording or other uses, for example, a radio wave absorber.

PRIOR ART DOCUMENT

Patent Document

[Patent Document 1] Japanese Unexamined Patent Publication No. 2016-130208
Patent Document 2: Japanese Patent No. 5966064

SUMMARY OF THE INVENTION

Problem to be Solved by the Invention

However, in the epsilon-type iron oxide magnetic powder, the variation in the particle diameters of the epsilon-type iron oxide particles constituting the epsilon-type iron oxide magnetic powder may become large, and particularly, when the substitutional element is added for the purpose of adjusting the magnetic properties, the above influence becomes large. Particularly in magnetic recording applications, such a particle diameter variation also causes a large noise value in the signal-to-noise ratio (S/N ratio) which is one of the electromagnetic conversion properties of the magnetic recording medium, resulting in a fatal situation in some cases. Accordingly, epsilon-type iron oxide magnetic powder with reduced particle diameter variation as much as possible is desired. Further, if a magnetic material having a high magnetization value (good magnetic properties) can be obtained even in a case of the same occupied volume, it can be expected to be widely applicable to high density magnetic recording, magnetic components, etc., driven by utilizing magnetism.

In view of the above problem, the present invention is provided, and an object of the present invention is to provide epsilon-type iron oxide magnetic particles having a small variation in a particle size distribution and having an appropriate particle diameter, and particularly to a magnetic powder in which a saturation magnetization value per volume is increased by reducing single nano-order level particles which are likely to be superparamagnetic.

Another object of the present invention is to provide a magnetic powder with narrow particle size distribution of epsilon-type iron oxide particles, and to provide a magnetic powder suitable for magnetic recording medium by improving the particle size distribution.

Means for Solving the Problem

According to a first aspect of the present invention, there is provided epsilon-type iron oxide magnetic particles in which a number average particle diameter of major diameters ($D_{50}$) is 10 to 20 nm, a 90% cumulative particle diameter ($D_{90}$) is 30 nm or less, and a geometric standard deviation ($\sigma_g$) of major diameters is 1.45 or less, which are obtained by TEM observation.

According to a second aspect of the present invention, there is provided the epsilon-type iron oxide magnetic particles of the first aspect, wherein at least a part of an iron site of the epsilon-type iron oxide magnetic particles is substituted.

According to a third aspect of the present invention, there is provided the epsilon-type iron oxide magnetic particles of the first or second aspect, wherein when the epsilon-type iron oxide magnetic particles are spherically approximated, an average volume is 5000 $nm^3$ or less.

According to a fourth aspect of the present invention, there is provided a coating material containing the epsilon-type iron oxide magnetic particles of any one of the first to third aspects.

According to a fifth aspect of the present invention, there is provided a magnetic recording medium containing the epsilon-type iron oxide magnetic particles of any one of the first to third aspects.

According to a sixth aspect of the present invention, there is provided a magnetic component containing the epsilon-type iron oxide magnetic particles of any one of the first to third aspects.

According to a seventh aspect of the present invention, there is provided epsilon-type iron oxide magnetic powder containing epsilon-type iron oxide particles having less than 35% variation coefficient of major diameters obtained by transmission electron microscope observation.

According to an eighth aspect of the present invention, there is provided the epsilon-type iron oxide magnetic powder of the seventh aspect, containing epsilon-type iron oxide particles wherein an average aspect ratio obtained by transmission electron microscope observation is 1.1 or less.

According to a ninth aspect of the present invention, there is provided the epsilon-type iron oxide magnetic powder of the seventh or eighth aspect, wherein a number average particle diameter of major diameters obtained by transmission electron microscopic observation is 10 nm or more and 20 nm or less.

According to a tenth aspect of the present invention, there is provided a method for producing epsilon-type iron oxide magnetic powder, including:

mixing an aqueous solution containing a water-soluble iron salt or an aqueous solution containing the water-soluble iron salt and a salt of a metal element M other than iron, into a silicon compound having a hydrolyzable group, then keeping the mixture at 50° C. or less in stationary state, and obtaining a gel of silicon oxide containing the iron salt or silicon oxide containing the iron salt and the metal element M;

heating the gel of silicon oxide containing the iron salt or silicon oxide containing the iron salt and the metal element M, and obtaining a powder of epsilon-type iron oxide coated with silicon oxide; and dissolving silicon oxide coating the epsilon-type iron oxide, and obtaining epsilon-type iron oxide magnetic powder.

According to an eleventh aspect of the present invention, there is provided the method for producing epsilon-type iron oxide magnetic powder of the tenth aspect, wherein the step of obtaining the gel of silicon oxide containing the iron salt or silicon oxide containing the iron salt and the metal element M further includes: mixing an aqueous solution containing a water-soluble iron salt or an aqueous solution containing the water-soluble iron salt and a salt of a metal element M other than iron, into a water-soluble organic solvent, then mixing with the silicon compound having the hydrolyzable group, and keeping the mixture in a stationary state.

According to a twelfth aspect of the present invention, there is provided the method for producing epsilon-type iron oxide magnetic powder of the tenth or eleventh aspect, wherein the iron salt is a nitrate or a chloride.

According to a thirteenth aspect of the present invention, there is provided a coating material containing the epsilon-type iron oxide magnetic powder of any one of the seventh to ninth aspects.

According to a fourteenth aspect of the present invention, there is provided a magnetic recording medium containing the epsilon-type iron oxide magnetic particles of any one of the seventh to ninth aspects.

According to a fifteenth aspect of the present invention, there is provided a magnetic component containing the epsilon-type iron oxide magnetic particles of any one of the seventh to ninth aspects.

Advantage of the Invention

According to the present invention, it is possible to realize particularly a constitution of the magnetic particles having the improved particle size distribution. It is also possible to realize a constitution of the magnetic particles possible to reduce a superparamagnetic particle proportion, and suitable for magnetic recording medium by improving the particle size distribution.

DETAILED DESCRIPTION OF THE INVENTION

[Epsilon-Type Iron Oxide Magnetic Powder]

Figure 3:
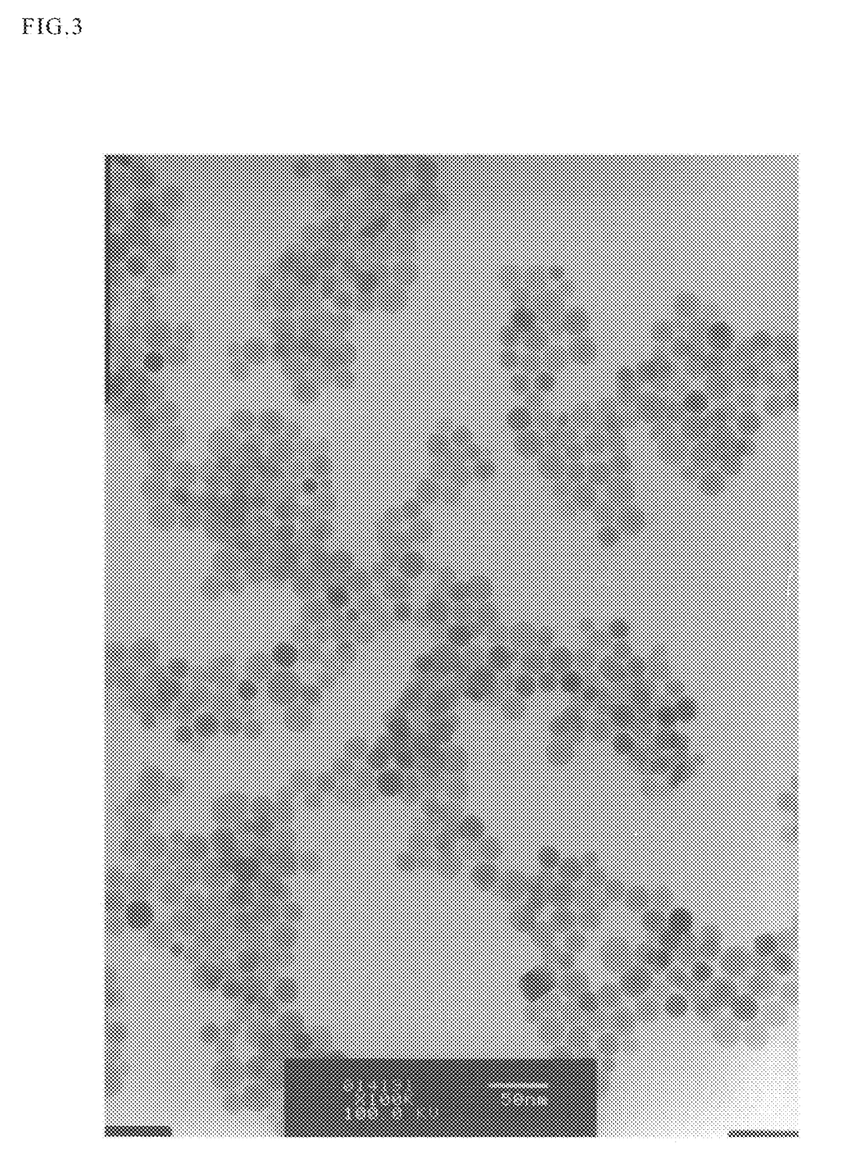
FIG. 3 is a photograph of epsilon-type iron oxide magnetic powder according to example 1, which is observed by a transmission electron microscope.

A production method of the present invention is for producing epsilon-type iron oxide magnetic powder containing epsilon-type iron oxide magnetic particles. Epsilon-type iron oxide is an epsilon iron oxide ($\varepsilon$ iron oxide) or an oxide obtained by substituting a part of an iron site of epsilon oxide ($\varepsilon$ iron oxide) with a metal element M other than iron. As the metal element M, known elements capable of substituting the iron site of $\varepsilon$-iron oxide, such as In, Ga, Al, Co, Ni, Mn, Zn, Ti and Sn, may be adopted. The epsilon-type iron oxide magnetic powder as the product of the present invention is observed by a transmission electron microscope, as shown in FIG. 3. The epsilon-type iron oxide magnetic particles are particles such as a particle seen in FIG. 3, and the epsilon-type iron oxide magnetic powder as the product of the present invention is an aggregate of the epsilon-type iron oxide magnetic particles.

[Oxide in which a Part of the Iron Site is Substituted with a Metal Element Other than Iron]

As the metal element M of the epsilon-type iron oxide magnetic particles in which at least a part of the iron site is substituted, elements disclosed in known documents such as Patent Document 1 and Patent Document 2 may be adopted.

[Dimension of the Epsilon-Type Iron Oxide Magnetic Powder]

The number average particle diameter of major diameters observed by a transmission electron microscope (sometimes referred to as TEM in this specification) of epsilon-type iron oxide particles constituting the epsilon-type iron oxide magnetic powder, is preferably 10 nm or more and 20 nm or less. If the particles are not more than 20 nm, it is easy to apply a thin layer of the magnetic layer, and as a result, high density can be achieved. Further, the volume of the particles can also be of an appropriate size, and therefore it is possible to suppress an increase in particulate noise which is an adverse effect of high density, and this is preferable. Further, if the particles are larger than 10 nm, the particles are hardly in a superparamagnetic state, and are easily magnetized when a magnetic field is applied, and therefore particles sufficient to mediate information can be obtained. In this specification, "the number average particle diameter of major diameters" is also referred to as "number average value of major diameters" or "average major diameter".

In this specification, the particle size distribution refers to the variation of major diameters and minor diameters of the particles observed by TEM. The smaller the variation, that is, the narrower the particle size distribution, it can be said that the powder is an epsilon-type iron oxide magnetic powder suitable for a magnetic recording medium. In the particle size distribution observed by TEM, it is preferable that 90% cumulative particle diameter $D_{90}$ of major diameters on number basis is 30 nm or less. Thereby, since there are few particles with extremely large particle size, it is conceivable that the particulate noise can be suppressed.

A geometric standard deviation value indicating the variation of major diameters is preferably 1.01 to 1.45, more preferably 1.01 to 1.40, further preferably 1.01 to 1.35, from a viewpoint of also having high-level medium properties. It can be said that being within such a range is a powder suitable for high density magnetic recording with few extremely large particles or extremely small particles.

Further, it is preferable that the spherical approximate average particle volume of the epsilon-type iron oxide magnetic powder is 5000 nm$^3$ or less. The spherically approximated average particle volume can be calculated as the volume of a sphere having a diameter of an average major diameters calculated from TEM observation. That is, (Average particle volume; nm$^3$)=(4/3)×π×(average major diameter (nm)/2)$^3$ is established. Epsilon-type iron oxide magnetic powder having such an average particle volume of 5000 nm$^3$ or less, is suitable as a magnetic powder for a high density magnetic recording medium and therefore preferable.

Further, the variation coefficient of major diameters is less than 35%, which is obtained by TEM observation for the epsilon-type iron oxide magnetic powder as the product of the present invention. According to the production method of the present invention, it is possible to obtain the epsilon-type iron oxide magnetic powder having less than 35% variation coefficient of major diameters and having narrow particle size distribution. It can be said that being within such a range is a powder suitable for high density magnetic recording with few extremely large particles or extremely small particles. The variation coefficient of major diameters is preferably 30% or less, and more preferably 25% or less, from a viewpoint of further increasing recording density.

Further, by adopting the production method of the present invention, the average aspect ratio of the epsilon-type iron oxide magnetic powder can be set to 1.1 or less. By setting the average aspect ratio of the epsilon-type iron oxide magnetic powder to 1.1 or less, when producing a magnetic recording medium or a magnetic component by mixing the epsilon-type iron oxide magnetic powder with a resin or the like, the epsilon-type iron oxide particles are more easily oriented by an external magnetic field, and output properties of the magnetic recording medium can be improved.

[Method for Producing Epsilon-Type Iron Oxide Iron Magnetic Powder]

The production method of the present invention is the method of precipitating the epsilon-type iron oxide magnetic particles by directly firing the dried body of the gel of silicon oxide containing iron salt or the gel of silicon oxide containing the iron salt and metal element M, without generating a precursor such as iron oxyhydroxide, ferrihydrite, wustite and magnetite. In this embodiment, as a specific example, the method for producing epsilon-type iron oxide magnetic powder is performed, including the following steps.

mixing an aqueous solution containing water-soluble iron salt or an aqueous solution containing the water-soluble iron salt and a salt of the metal element M other than iron, into a silicon compound having a hydrolyzable group, then keeping the mixture at 50° C. or less in stationary state, and obtaining the gel of silicon oxide containing the iron salt or silicon oxide containing the iron salt and the metal element M;

heating the gel of silicon oxide containing the iron salt or silicon oxide containing the iron salt and the metal element M, and obtaining a powder containing an iron oxide coated with silicon oxide or an oxide containing the iron and the metal element M coated with silicon oxide; and dissolving silicon oxide coating the iron oxide or silicon oxide coating the iron and the metal element M, and obtaining an epsilon-type iron oxide magnetic powder, wherein the step of obtaining the gel of silicon oxide containing the iron salt or silicon oxide containing the iron salt and the metal element M further includes:

mixing the aqueous solution containing the water-soluble iron salt or the aqueous solution containing the water-soluble iron salt and the salt of the metal element M other than iron, into a water-soluble organic solvent, then mixing the mixture into the silicon compound having the hydrolyzable group, and keeping the mixture in a stationary state.

In adopting this method, the epsilon-type iron oxide iron magnetic powder is prepared by mixing an iron source (which may be a bivalent one or a trivalent one), a substitutional element source, and water, and if necessary, a water-soluble organic solvent (for example, ethanol, methanol, etc.) and, if necessary, a polymer (polyethylene glycol, etc). When it is necessary to use a substitutional metal element, elements disclosed in known documents such as Patent Document 1 and Patent Document 2 can be selected and used.

Here, the water-soluble organic solvent (hydrophilic solvent) refers to an organic compound which has water-solubility of 30 g/100 g (H$_2$0) or more and in a state of liquid at normal temperature and normal pressure.

Here, the mixing ratio of water and the water-soluble organic solvent (hydrophilic solvent) is such that the molar ratio of water/water-soluble organic solvent is 1.5 or less, preferably 1.0 or less. When the ratio exceeds 1.5, a silicon compound having a hydrolyzable group does not mix and separates from water at the time of mixing with water, and particularly when trying to form substitutional epsilon-type iron oxide magnetic particles, the composition becomes non-uniform, and this is not preferable because a magnetic powder having excellent properties cannot be obtained.

Further, an amount of the water-soluble organic solvent to be added is preferably set to a necessary amount for dissolving the silicon compound having the hydrolyzable group in a water-soluble organic solvent. At this time, the molar ratio of the water-soluble organic solvent to the silicon compound having the hydrolyzable group (the water-soluble organic solvent/the silicon compound having the hydrolyzable group) is preferably set to 7.0 or more. Since the molar ratio of the water-soluble organic solvent to the silicon compound having the hydrolyzable group is within this range, it is easy to obtain the epsilon-type iron oxide magnetic powder having low variation coefficient of major diameters and having a narrow particle size distribution.

The "silicon compound having the hydrolyzable group" is the silicon compound having the hydrolyzable group in the molecular framework, and examples of the metal alkoxide include tetraethoxysilane (TEOS), tetramethoxysilane (TMOS), silane coupling agent and the like.

Further, the ratio of "the molar amount of the silicon compound having the hydrolyzable group" to "the total molar amount of the iron and the substitutional metal element M" is preferably 4.0 or more. In this way, by sufficiently increasing the amount of the silicon compound having the hydrolyzable group relative to the molar amount of the metal, it is easy to obtain the epsilon-type iron oxide magnetic powder having low variation coefficient of major diameters and having narrow particle size distribution.

Further, here, the iron and the substitutional element are in the form of an aqueous solution, or in the form in which metal is dissolved in acid. For a supply source of the iron and the substitutional element, inorganic salts or organic salts may be used, examples of the inorganic salt include nitrate, sulfate, chloride and the like. It is preferable to use iron nitrate or chloride as the iron salt, from a viewpoint of increasing a coercive force and narrowing a coercive force distribution of the epsilon-type iron oxide magnetic powder. Further, a total amount of metal ions of the iron and the substitutional element is preferably 3.5 mol/L or less, preferably 2.0 mol/L or less.

After addition of silicon oxide having the hydrolyzable group, the solution was stirred until the solution became uniform, and the mixture is kept in a stationary state in a temperature environment of 50° C. or less, and let it stand until the fluidity of the liquid after stirring is lost. By setting the temperature for keeping in this stationary state to 50° C. or less, it is possible to narrow the particle size distribution of the finally obtained epsilon-type iron oxide particles. If the temperature for keeping in this stationary state is set to over 50° C., the particle size distribution of the finally obtained epsilon-type iron oxide particles is widened, and the effect of the present invention cannot be obtained.

Figure 1:
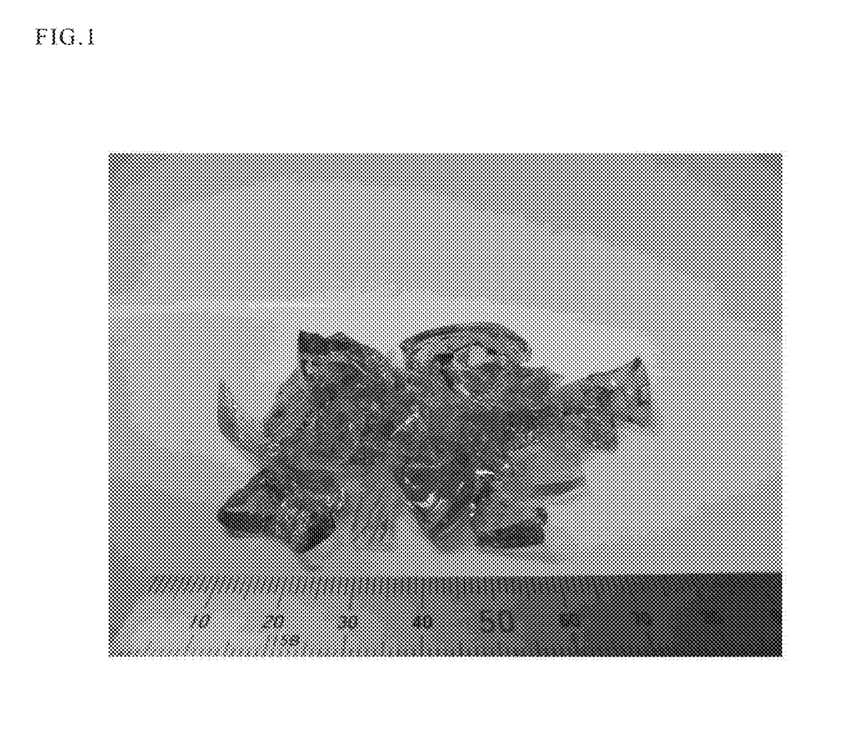
FIG. 1 is a photograph showing an example of a dried body of a gel.

The gel with lost fluidity is placed at a temperature of 5° C. or more, preferably 10° C. or more, which is more than the temperature under the stationary environment at the time of forming the gel, and under a heated environment at or below a boiling point of the water-soluble organic solvent, excess solvent is volatilized and removed. Due to solidification through this drying step, it is possible to reduce the variation of compositions in the final iron oxide, and this is preferable. An example of the gel dried body is shown in FIG. 1.

The obtained solid material may be granulated and used as a sample before the heating step (dried body of the gel), and preferably has a particle size of 2 mm or less, more preferably 1 mm or less, further preferably 500 μm or less. By making it into powder, firing unevenness in the subsequent heating step can be reduced, dissolution of silicon oxide becomes easy in silicon oxide coating removal step, and a magnetic powder excellent in magnetic properties can be obtained, and this is preferable.

[Heating Step]

The obtained pre-heated sample is subjected to heat treatment to obtain epsilon-type iron oxide. Prior to the heat treatment, washing and drying steps may be provided. The heat treatment is performed in an oxidizing atmosphere, and the oxidizing atmosphere may be an air atmosphere. Heating can be performed generally in a range of 700° C. or more and 1300° C. or less, but when the heating temperature is high, $\alpha$-$Fe_2O_3$ which is a thermodynamically stable phase (impurity unlike $\epsilon$-$Fe_2O_3$) is likely to be formed. Therefore, the heating temperature is preferably 900° C. or more and 1200° C. or less, more preferably 950° C. or more and 1150° C. or less.

The heat treatment time can be adjusted in a range of 0.5 hour or more and 10 hours or less after the temperature reaches a setting temperature, but good results are easily obtained within a range of 2 hours more and 5 hours or less. It is conceivable that the presence of the silicon-containing material that coats the particles, acts advantageously in inducing a phase change to the epsilon-type iron oxide magnetic particles rather than a phase change to an $\alpha$-type iron-based oxide.

Through the above steps, in the case where the raw material solution contains trivalent ion ions as metal ions, and metal elements for substituting iron sites, a partially substitutional $\epsilon$-$Fe_2O_3$ crystal can be obtained in a state of being coated with silicon oxide. As a powder obtained after the heat treatment, there is a case where $\alpha$-type iron type oxide, $\gamma$-type iron type oxide, or $Fe_3O_4$ crystal is present as impurities in addition to the epsilon-type iron oxide crystal, and they are all called the epsilon-type iron oxide particles.

The epsilon-type iron oxide magnetic particles obtained by the production method of the present invention can be used in a state of being coated with silicon oxide. However, the epsilon-type iron oxide magnetic particles can also be used in a state where silicon oxide coating the surface is removed in a step described later, depending on the application. It is acceptable to apply crushing treatment using a planetary ball mill or the like, to the epsilon-type iron oxide magnetic particles coated with silicon oxide, if necessary for the convenience of the subsequent step (to increase a dissolution rate of silicon oxide).

[Silicon Oxide Coating Removal Step]

When the epsilon-type iron oxide magnetic particles do not require coating with silicon oxide, silicon oxide coating the $\epsilon$-$Fe_2O_3$ crystal is removed. In the application as a coating type magnetic recording medium, it is necessary to apply a magnetic field orientation treatment to the magnetic particles coated on a tape, and in the state of being coated with silicon oxide, an amount of silicon oxide which is a nonmagnetic component is increased and an amount of magnetization per unit area of the tape is decreased (The signal from the tape is weakened). Therefore, it is preferable to remove the coated silicon oxide by the step described later.

As a specific method, since silicon oxide is soluble in alkaline aqueous solution, silicon oxide can be dissolved and removed by making the powder after heat treatment immersed in an aqueous solution in which a strong alkali such as NaOH or KOH is dissolved and stirring this alkaline aqueous solution. When increasing the dissolution rate, it is advisable to warm the alkaline aqueous solution.

Typically, an alkali such as NaOH, KOH or the like is added in an amount of 2 times or more moles with respect to silicon oxide, and the powder is stirred under an aqueous solution temperature of 40° C. or more, preferably 60° C. or more and 80° C. or less, then silicon oxide can be dissolved well. The degree of removing silicon oxide coating is adjusted according to the purpose.

[Transmission Electron Microscope (TEM) Observation]

TEM observation for the epsilon-type iron oxide magnetic powder obtained by the production method of the present invention was performed under the following conditions.

—Preparation of a Photographed Sample—

About 0.005 g of epsilon-type iron oxide magnetic powder was added to 10 mL of 2 mass % collodion solution, and subjected to ultrasonic dispersion treatment to obtain a slurry containing the epsilon-type iron oxide magnetic powder. One to two droplets of the obtained slurry was dropped into water to form a collodion film, which was adhered to one side of a grid, and after air drying, carbon deposition was applied thereto. The grid subjected to the carbon deposition was subjected to TEM observation.

JEM-1011 manufactured by JEOL Ltd. was used for the TEM observation. Particles were observed by photographing at a magnification of 100,000, and thereafter a TEM photograph enlarged three times during development was used.

—Major Diameter Measurement—

Digitizing was used for evaluating the number average particle diameter of major diameters and particle size distribution. As image processing software, Mac-View Ver. 4.0 was used. (In a case of using this image software, out of rectangles circumscribing the particle, a rectangle with a smallest area is derived, and a length of its long side is calculated as a major diameter of one particle.). Regarding the number, more than 200 major diameters were measured.

Among the particles shown on the transmission electron micrographs, selection criteria for the particles to be measured are as follows.

[1] Particles a part of which protrude beyond a field of view of the photograph are not measured.
[2] Isolated particles whose outlines are clear are measured.
[3] Even when each particle is out of an average particle shape, particles that can be measured independently as independent particles are measured.
[4] In a case of the particles that overlap each other, but a boundary between them is clear, and the particles whose overall shape can be judged, each particle is measured as a single particle.
[5] Particles that overlap each other, but the boundary between them is unclear, and the particles whose entire particle shape is unknown, are not measured as the particle shape cannot be determined.

The number average value of major diameters of the particles selected according to the above criteria was calculated, which was defined as the number average particle diameter of major diameters obtained by TEM observation for the epsilon-type iron oxide magnetic powder. Further, the value obtained by dividing the "standard deviation of major diameters of the selected particles" by the "number average value (=average major diameter)" of major diameters of the selected particles was calculated, which was defined as the variation coefficient of major diameters obtained by TEM observation for the epsilon-type iron oxide magnetic powder. Further, a geometric standard deviation of major diameters of the selected particles was calculated, which was defined as a geometric standard deviation of major diameters obtained by TEM observation for the epsilon-type iron oxide magnetic powder. Then, a harmonic average of major diameters of the selected particles was calculated, which was defined as a harmonic average diameter of major diameters obtained by TEM observation for the epsilon-type iron oxide magnetic powder.

The geometric standard deviation was obtained by calculating a common logarithm value of each measurement value of major diameters of the selected particles, and when the standard deviation value of each calculated common logarithm value is defined as n, the geometric standard deviation was calculated as n-power of 10. Further, the harmonic average diameter was obtained by calculating a reciprocal value of each measured value of major diameters of the selected particles, and when the number average value of the calculated reciprocal values is defined as m, the harmonic average diameter was calculated as the reciprocal of m.

[Minor Diameter, Aspect Ratio Evaluation, 90% Cumulative Particle Diameter and 10% Cumulative Particle Diameter]

For each particle selected by the major diameter measurement, a minor diameter was measured. Here, the minor diameter refers to a length of a short side of the rectangle having a smallest area out of the rectangle circumscribing the selected certain particle. The number average of the measured values of the minor diameter of each selected particle was calculated, which was defined as an average minor diameter of the epsilon-type iron oxide magnetic powder. The value obtained by dividing the average major diameter by the average minor diameter was defined as the average aspect ratio of the epsilon-type iron oxide magnetic powder.

Further, the 90% cumulative particle diameter and the 10% cumulative particle diameter obtained by TEM observation for the epsilon-type iron oxide magnetic particles were calculated from the data of a major diameter distribution obtained by the major diameter measurement.

[Composition Analysis by High Frequency Inductively Coupled Plasma Emission Spectroscopy (ICP)]

The composition of the obtained epsilon-type iron oxide magnetic powder was analyzed using ICP-720 ES made by Agilent Technologies, and the wavelengths (nm) were measured as follows: Fe was 259.940 nm, Ga was 294.363 nm, Co was 230.786 nm, and Ti was 336. 122 nm.

[Measurement of Magnetic Properties]

Magnetic properties were measured using a vibrating sample magnetometer VSM (VSM-5, manufactured by Toei Kogyo Co., Ltd.), with an applied magnetic field of 1035 kA/m (13 kOe), an M measurement range of 0.005 A·m$^2$ (5 emu), a step bit of 80 bits, a time constant of 0.03 sec, and a waiting time of 0.1 sec. Data was obtained by measuring a coercive force Hc and saturation magnetization as by B-H curve. Further, for this measurement and evaluation, attached software (Ver.2.1) manufactured by Toei Industry Co., Ltd. was used.

EXAMPLES

Figure 2:
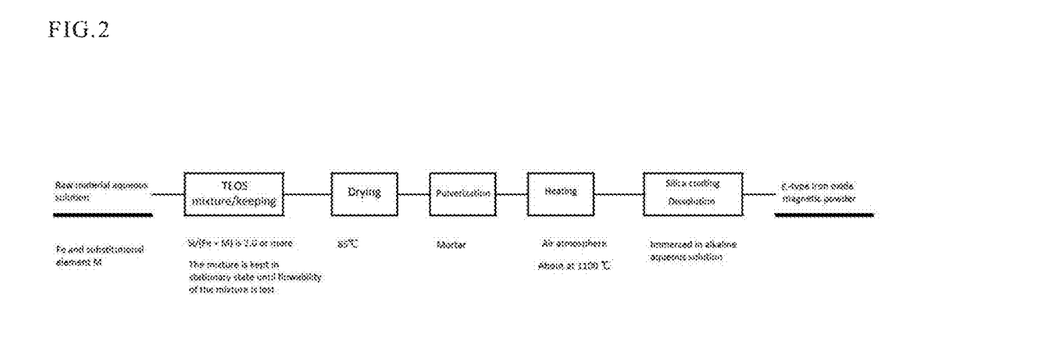
FIG. 2 is a diagram showing a flowchart in this example.

Hereinafter, the present invention will be described in detail using examples, but the present invention is not limited to them at all. These examples are shown in accordance with a flowchart shown in FIG. 2.

Example 1

33.04 g of ferric nitrate (II) 9 hydrate (Fe(NO$_3$)$_3$·9H$_2$O)) having a purity of 99.7 mass %, 13.60 g of a Ga (III) nitrate solution having a Ga concentration of 9.44 mass %, 0.79 g of cobalt (II) nitrate hexahydrate having a purity of 97 mass %, 0.83 g of titanium sulfate (IV) having a Ti concentration of 15.1 mass % were dissolved in 80.0 g of pure water in 1 L reaction tank, while mechanically stirring with a stirring blade in the air atmosphere. The molar ratio of the metal ions in this charged solution was Fe:Ga:Co:Ti=1.550:0.350:0.050:0.050.

Next, 456.27 g of ethanol (special grade reagent: boiling point 78.37° C.) was added, and thereafter 256.96 g of TEOS (tetraethyl orthosilicate: Si(OC2H5) 4, ethyl silicate 28 manufactured by Colcoat Co., Ltd.) was added, and further 40 g of pure water was added, followed by mixing for 30 minutes with a magnetic stirrer. The mass of the composition after mixing was measured (mass excluding tare weight: 873.66 g), and the mass was checked while monitoring the mass under constant temperature condition at 40° C., and the composition was allowed to stand in a stationary state until a mass decrease of 70% was observed (mass excluding tare weight: 257.40 g), that is, until a stage where the mass (reference mass) in the mixture after mixing reaches 30% of a total mass before starting the stationary. The fluidity of the mixture has already been lost at this stage. Thereafter, after drying under dry conditions at 65° C. for 14 hours, a dry mass of the gel was checked again (mass excluding tare weight: 201.15 g) by measuring the mass again. Here, the ratio of the number of moles of Si added as TEOS to the total number of moles (Fe+M) of the metal ions in the charged solution was calculated, and Si/(Fe+M) was found to be 11.7. Further, the ratio of the number of moles of added ethanol to the number of moles of added TEOS (organic solvent/TEOS) was calculated, and the ratio was found to be 8.0.

The obtained solid material was broken into pieces by hand, then sieved using a sieve with a mesh size of 500 μm, and only under powder was recovered and subjected to the next step. The obtained under powder was heated at 110° C. for 12 hours, and further, excess liquid was removed.

Thereafter, heat treatment was performed at 1125° C. for 4 hours in a furnace in the air atmosphere, to obtain epsilon-type iron oxide magnetic particles coated with silicon oxide. Further, the obtained heat-treated powder was granulated to 100 μm or less using a planetary ball mill, then, 20 mass % NaOH was added, and the mixture was stirred at about 70° C. for 24 hours, thereby removing silicon oxide on the particle surface, to obtain an epsilon-type iron oxide magnetic powder of Example 1. FIG. 3 shows a photograph of a transmission electron microscope of the epsilon-type iron oxide magnetic particles obtained in Example 1.

The particle size of the epsilon-type iron oxide magnetic powder on number basis according to Example 1 was as follows: the number average particle diameter of major diameters was 17.7 nm, and 90% cumulative particle diameter (D90) on number basis was 22.2 nm. Further, the composition of the obtained particles was checked by ICP luminescence analysis measurement. Then, the molar ratio of the metal ions was calculated as Fe:Ga:Co:Ti=1.58:0.31:0.05:0.05. Further, the standard deviation of major diameters was (nm) 3.59 nm, the variation coefficient of major diameters was 20%, and the geometric standard deviation σg was 1.24. Further, the average aspect ratio was 1.05, and σs/V (Am²/kg·nm²) was 0.006 (Am²/kg·nm²).

Comparative Example 1

The epsilon-type iron oxide magnetic powder was prepared by the procedure of Example 2 described in Japanese Patent No. 5966064. That is, 2910.27 g of ferric nitrate (III) 9 hydrate having a purity of 99.5 mass %, 786.25 g of a gallium (III) nitrate solution having a Ga concentration of 10.3 mass %, 65.76 g of cobalt (11) nitrate hexahydrate having a purity of 97 mass %, and 69.04 g of titanium sulfate (IV) having a Ti concentration of 15.2 mass % were dissolved in 31368.68 g of pure water in 30 L reaction tank, while mechanically stirring with a stirring blade under the condition of 40° C. in the air atmosphere. The molar ratio of the metal ions in this charged solution was Fe:Ga:Co:Ti=1.635:0.265:0.050:0.050. Numbers in parentheses after the name of the reagent represent the valence of the metal element.

While mechanically stirring with a stirring blade at 40° C. in the air atmosphere, 1595.91 g of a 22.09 mass % ammonia solution was added all at once and stirring was continued for 2 hours. In an initial stage of addition, the color of the solution was brown and it was a muddy solution, but after 2 hours, the solution became a brown reaction solution with transparency, and its pH was 1.67.

Next, 1684.38 g of a citric acid solution having a citric acid concentration of 10 mass % was continuously added over 1 hour under the condition of 40° C., and thereafter 2000 g of a 10 mass % ammonia solution was added all at once, and pH was adjusted to 8.51. Thereafter, the mixture was kept under stirring at a temperature of 40° C. while stirring for 1 hour to produce crystals of iron oxyhydroxide containing a substitutional element which is an intermediate precursor (Procedure 1).

Although not shown, an X-ray diffraction pattern of the iron oxyhydroxide crystal containing the substitutional element obtained in this example shows that iron oxyhydroxide has a ferrihydrite structure.

The slurry obtained in Procedure 1 was recovered, and was washed on ultrafiltration membrane, UF Fractionation membrane with a molecular weight of 50,000, until the electric conductivity of a filtrate became 50 mS/m or less. Further, the conductivity of the washed slurry was 105 mS/m (procedure 2).

3162.89 g (containing 60 g of ε-Fe$_2$O$_3$ (partially substituted product)) of the washed slurry liquid obtained in Procedure 2 was taken in 5 L reaction tank, and pure water was added so that a liquid volume became 4000 mL, then 212.46 g of a 22.09 mass % ammonia solution was added while stirring in the air at 30° C., and then 428.95 g of tetraethoxysilane (TEOS) was added to the slurry liquid in 35 minutes. The mixture was continuously stirred for about 1 day, and particles of the slurry were coated with silanol derivative generated by hydrolyzation. Thereafter, a solution prepared by dissolving 202.6 g of ammonium sulfate in 300 g of pure water was added to the slurry, and the obtained slurry was washed, solid-liquid separated and recovered as a cake (Procedure 3). Then, the ratio of the number of moles of Si added as TEOS to the total number of moles (Fe+M) of metal ions in the charged solution was calculated. Si/(Fe+M) was found to be 2.8.

A precipitate (gel-like SiO$_2$-coated precursor) obtained in Procedure 3 was dried, and then the dry powder was pulverized. Thereafter, the dry powder was subjected to a heat treatment for 4 hours at 1066° C. or more and 1079° C. or less in a furnace in the air atmosphere, to obtain an iron oxide powder coated with silicon oxide. The above-mentioned silanol derivative changes to an oxide upon heat treatment in the air atmosphere (Procedure 4).

The heat-treated powder obtained in Procedure 4 was stirred in a 20 mass % NaOH aqueous solution at about 70° C. for 24 hours, and silicon oxide on the particle surface is removed. Subsequently, the slurry on the ultrafiltration membrane and the UF fractionation membrane with molecular weight of 50,000 was washed until the electric conductivity of the washed slurry became 1.476 mS/m. (Procedure 5)

Pure water was added to the obtained magnetic powder-containing slurry, then an aqueous NaOH solution was added so as to have a pH of 11.0, then the mixture was subjected to ultrasonic dispersion treatment for 1 hour with an ultrasonic washer (BRANSON (Yamato) 5510 of Emerson Electric Co.), and then subjected to centrifugation treatment at 8000 rpm for 30 minutes by R 10A3 rotor centrifuge (manufactured by Hitachi Koki Co., Ltd., himac 21G2). A precipitate containing coarse particles was removed, then the same operation was performed twice, to obtain a coarse particle-removed slurry liquid.

Subsequently, treatment of removing fine particles from the obtained slurry liquid was performed. Pure water was added to the magnetic powder-containing slurry obtained above, and an aqueous NaOH solution was added so as to have a pH of 11.0, then the mixture was subjected to ultrasonic dispersion treatment for two hours by ultrasonic homogenizer (US-600TCVP), then subjected to centrifugation treatment at 8000 rpm for 30 minutes by R10A3 rotor centrifuge (himac 21G2), to remove a supernatant containing fine particles.

Figure 4:
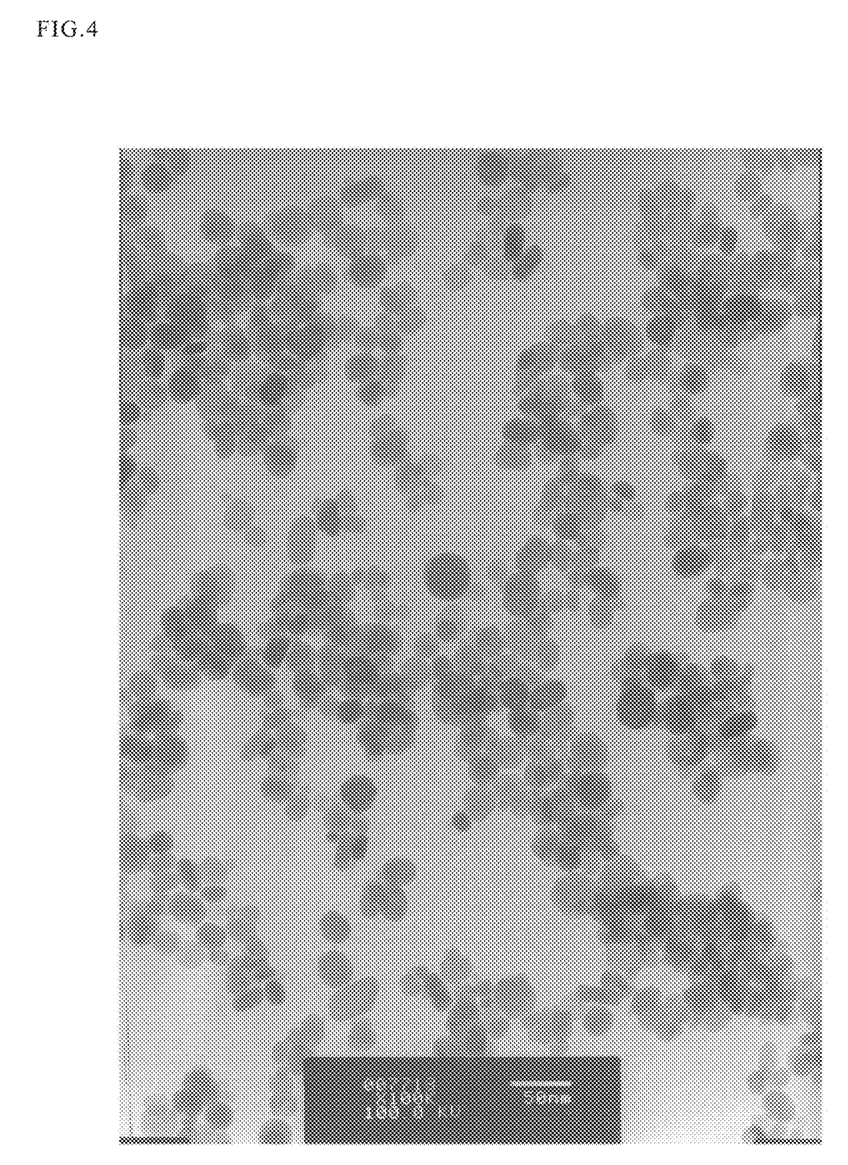
FIG. 4 is a photograph of the epsilon-type iron oxide magnetic powder according to comparative example 1, which is observed by a transmission electron microscope.

Further, pure water was added to the obtained precipitate, an aqueous NaOH solution was added so as to have a pH of 11.0, then the mixture was subjected to ultrasonic dispersion treatment, for one hour in an ultrasonic washer (BRANSON (Yamato) 5510 of Emerson Electric Company), and then subjected to centrifugation treatment at 8000 rpm for 30 minutes by R10A3 rotor centrifuge (himac 21 G 2). After removing the supernatant containing fine particles, the same operation was performed again, the precipitate from which the fine particles had been removed was subjected to membrane filtration so that cake was recovered, and then dried, to obtain a sample of Comparative Example 1. FIG. 4 shows a photograph of a transmission electron microscope of the epsilon-type iron oxide magnetic particles obtained in Comparative Example 1. A particle size of the epsilon-type iron oxide magnetic particle sample according to Comparative Example 1 on number basis was as follows: the number average particle diameter of major diameters was 21.4 nm, and the 90% cumulative particle diameter (D90) of major diameters on number basis was 31.4 nm. Further, the standard deviation of major diameters was (nm) 7.46 nm, the variation coefficient of major diameters was 35%, and the geometric standard deviation σg was 1.47. Further, the average aspect ratio was 1.21, and σs/V (Am$^2$/kg·nm$^2$) was 0.003 (Am$^2$/kg·nm$^2$).

Hereafter, Table 1 summarizes the average particle diameter (that is, average major diameter), standard deviation, geometrical standard deviation, and harmonic average diameter of the magnetic powders of Example 1 and Comparative Example 1. Further, Table 2 shows the results of the average particle volume V, coercive force Hc (Oe), coercive force Hc (kA/m), saturation magnetization σs and saturation magnetization σs/V per volume in Example 1 and Comparative Example 1.

TABLE 1

| | Average particle diameter (nm) | Standard deviation (nm) | Geometric standard deviation | Harmonic average diameter (nm) |
|---|---|---|---|---|
| Example 1 | 17.7 | 3.59 | 1.24 | 17.0 |
| Comparative example 1 | 21.4 | 7.46 | 1.47 | 18.4 |

TABLE 2

| | Average particle volume V (nm$^2$) | Hc (Oe) | Hc (kA/m) | σs (A·m$^2$/kg) | σs/V (A·m$^2$/kg·nm$^3$) |
|---|---|---|---|---|---|
| Example 1 | 2893.6 | 2497 | 198.7 | 17.5 | 0.006 |
| Comparative example 1 | 5131.4 | 3979 | 316.6 | 15.1 | 0.003 |

Example 2

166.20 g of ferric nitrate (II) 9 hydrate (Fe(NO$_3$)$_3$·9H$_2$O)) having a purity of 99.7 mass %, 68.39 g of a Ga (III) nitrate solution having a Ga concentration of 9.44 mass %, 3.02 g of cobalt (II) nitrate hexahydrate having a purity of 97 mass %, and 4.19 g of titanium sulfate (IV) having a Ti concentration of 15.1 mass % were dissolved in 400.0 g of pure water in 5 L reaction tank, while mechanically stirring with a stirring blade in the air atmosphere. The molar ratio of the metal ions in this charged solution was Fe:Ga:Co:Ti=1.560:0.350:0.040:0.050.

Next, 2281.37 g of ethanol (special grade reagent: boiling point 78.37° C.) was added, then 1284.80 g of TEOS (tetraethyl orthosilicate: Si (OC$_2$H$_5$)$_4$, ethyl silicate 28 manufactured by Colcoat Co., Ltd.) was added, and further 200 g of pure water was added, and then the mixture was stirred with a magnetic stirrer for 30 minutes. Then, the ratio of the number of moles of Si added as TEOS to the total number of moles (Fe+M) of metal ions in the charged solution was calculated. Si/(Fe+M) was found to be 11.7. Further, the ratio of the number of moles of added ethanol to the number of moles of added TEOS (organic solvent/TEOS) was calculated, and it was found to be 8.0.

Thereafter, the mixture was left to stand under 40 t constant temperature condition until mass loss of 70% was observed, while monitoring the mass in the same way as in Example 1, and a mixture with lost flowability was obtained, which was then dried at 65° C. for 14 hours under a dry condition, and the obtained solid material was broken into pieces, then sieved using a sieve with a mesh size of 500 μm, and the obtained under powder was heated at 110° C. for 12 hours.

Next, the under powder was subjected to heat treatment at 1125° C. for 4 hours in a furnace in the air atmosphere, to obtain epsilon-type iron oxide magnetic particles coated with silicon oxide. Further, treatment of removing silicon oxide on the particle surface was performed by granulating the obtained heat-treated powder to 100 μm or less using a planetary ball mill, then adding 20 mass % NaOH, and stirring the mixture at about 70° C. for 24 hours, to obtain epsilon-type iron oxide magnetic particles of Example 2.

The particle size of the epsilon-type iron oxide magnetic particles according to Example 2 on number basis was as follows: the number average particle diameter of major diameters was 17.6 nm, and the 90% cumulative particle diameter (D90) of major diameters on number basis was 20.8 nm. Further, the composition of the obtained particles was confirmed by ICP emission spectrometry. Then, the molar ratio of the metal ions was calculated as Fe:Ga:Co:Ti=1.56:0.34:0.04:0.06. Further, the standard deviation of major diameters was (nm) 3.34 nm, the variation coefficient of major diameters was 19%, and the geometric standard deviation σg was 1.22. Further, the average aspect ratio was 1.06, and σs/V (Am$^2$/kg·nm$^2$) was 0.006 (Am$^2$/kg·nm$^2$).

Example 3

33.24 g of ferric nitrate (II) 9 hydrate (Fe(NO$_3$)$_3$·9H$_2$O)) having a purity of 99.7 mass %, 13.68 g of a Ga (III) nitrate solution having a Ga concentration of 9.44 mass %, 0.60 g of cobalt (II) nitrate hexahydrate having a purity of 97 mass %, and 0.84 g of titanium sulfate (IV) having a Ti concentration of 15.1 mass % were dissolved in 37.39 g of pure water in 1 L reaction tank, while mechanically stirring with a stirring blade in the air atmosphere. The molar ratio of the metal ions in this charged solution was Fe:Ga:Co:Ti=1.560:0.350:0.040:0.050.

Next, 213.27 g of ethanol (special grade reagent: boiling point 78.37° C.) was added, then 120.10 g of TEOS (tetraethyl orthosilicate: Si (OC$_2$H$_5$)$_4$, ethyl silicate 28 manufactured by Colcoat Co., Ltd.) was added, and further 18.70 g of pure water was added, then the mixture was stirred with a magnetic stirrer for 30 minutes. Then, the ratio of the number of moles of Si added as TEOS to the total number of moles (Fe+M) of metal ions in the charged solution was calculated. Si/(Fe+M) was found to be 5.5. Further, the ratio of the number of moles of added ethanol to the number of moles of added TEOS (organic solvent/TEOS) was calculated, and it was found to be 8.0.

Thereafter, the mixture was left to stand under 25° C. constant temperature condition until mass loss of 70% was observed, while monitoring the mass in the same way as in Example 1, and a mixture with lost flowability was obtained, which was then dried at 65° C. for 14 hours under a dry condition, and the obtained solid material was broken into pieces, then sieved using a sieve with a mesh size of 500 μm, and the obtained under powder was heated at 110° C. for 12 hours.

Next, the under powder was subjected to heat treatment at 1090° C. for 4 hours in a furnace in the air atmosphere, to obtain epsilon-type iron oxide magnetic particles coated with silicon oxide. Further, treatment of removing silicon oxide on the particle surface was performed by granulating the obtained heat-treated powder to 100 μm or less using a planetary ball mill, then adding 20 mass % NaOH, and stirring the mixture at about 70° C. for 24 hours, to obtain epsilon-type iron oxide magnetic particles of Example 3.

The particle size of the epsilon-type iron oxide magnetic particles according to Example 3 on number basis was as follows: the number average particle diameter of major diameters was 19.0 nm, and the 90% cumulative particle diameter (D90) of major diameters on number basis was 23.0 nm. Further, the standard deviation of major diameters was (nm) 4.05 nm, the variation coefficient of major diameters was 21%, and the geometric standard deviation σg was 1.23. Further, the average aspect ratio was 1.06, and σs/V (Am$^2$/kg·nm$^2$) was 0.005 (Am$^2$/kg·nm$^2$).

Example 4

30.91 g of ferric nitrate (II) 9 hydrate (Fe(NO$_3$)$_3$.9H$_2$O)) having a purity of 99.7 mass %, and 15.28 g of a Ga (III) nitrate solution having a Ga concentration of 13.20 mass % were dissolved in 80.00 of pure water in 1 L reaction tank, while mechanically stirring with a stirring blade in the air atmosphere. The molar ratio of the metal ions in the charged solution was Fe:Ga=1.450:0.550.

Next, 456.27 g of ethanol (special grade reagent: boiling point 78.37° C.) was added, then 259.96 g of TEOS (tetra-ethyl orthosilicate: Si (OC$_2$H$_5$)$_4$, ethyl silicate 28 manufactured by Colcoat Co., Ltd.) was added, and further 40.00 g of pure water was added, then the mixture was stirred with a magnetic stirrer for 30 minutes. Then, the ratio of the number of moles of Si added as TEOS to the total number of moles (Fe+M) of metal ions in the charged solution was calculated. Si/(Fe+M) was found to be 11.7. Further, the ratio of the number of moles of added ethanol to the number of moles of added TEOS (organic solvent/TEOS) was calculated, and it was found to be 8.0.

Thereafter, the mixture was left to stand under 40° C. constant temperature condition until mass loss of 70% was observed, while monitoring the mass in the same way as in Example 1, and a mixture with lost flowability was obtained, which was then dried at 65° C. for 14 hours under a dry condition, and the obtained solid material was broken into pieces, then sieved using a sieve with a mesh size of 500 μm, and the obtained under powder was heated at 110° C. for 12 hours.

Next, the under powder was subjected to heat treatment at 1140° C. for 4 hours in a furnace in the air atmosphere, to obtain epsilon-type iron oxide magnetic particles coated with silicon oxide. Further, treatment of removing silicon oxide on the particle surface was performed by granulating the obtained heat-treated powder to 100 μm or less using a planetary ball mill, then adding 20 mass % NaOH, and stirring the mixture at about 70° C. for 24 hours, to obtain epsilon-type iron oxide magnetic particles of Example 4.

The particle size of the epsilon-type iron oxide magnetic particles according to Example 4 on number basis was as follows: the number average particle diameter of major diameters was 17.7 nm, and the 90% cumulative particle diameter (D90) of major diameters on number basis was 22.0 nm. Further, the standard deviation of major diameters was (nm) 4.16 nm, the variation coefficient of major diameters was 23%, and the geometric standard deviation σg was 1.28. Further, the average aspect ratio was 1.06, and σs/V (Am$^2$/kg·nm$^2$) was 0.004 (Am$^2$/kg·nm$^2$).

Example 5

42.63 g of ferric nitrate (II) 9 hydrate (Fe(NO$_3$)$_3$.9H$_2$O)) having a purity of 99.7 mass %, was dissolved in 50.42 of pure water in 1 L reaction tank, while mechanically stirring with a stirring blade in the air atmosphere. This sample is an epsilon-type iron oxide particle which does not substitute a part of the iron site.

Next, 196.88 g of ethanol (special grade reagent: boiling point 78.37° C.) was added, then 120.00 g of TEOS (tetra-ethyl orthosilicate: Si (OC$_2$H$_5$)$_4$, ethyl silicate 28 manufactured by Colcoat Co., Ltd.) was added, and further 10.00 g of pure water was added, then the mixture was stirred with a magnetic stirrer for 30 minutes. Then, the ratio of the number of moles of Si added as TEOS to the total number of moles (Fe+M) of metal ions in the charged solution was calculated. Si/(Fe+M) was found to be 5.5. Further, the ratio of the number of moles of added ethanol to the number of moles of added TEOS (organic solvent/TEOS) was calculated, and it was found to be 7.4.

Thereafter, the mixture was left to stand under 25° C. constant temperature condition until mass loss of 70% was observed, while monitoring the mass in the same way as in Example 1, and a mixture with lost flowability was obtained, which was then dried at 65° C. for 14 hours under a dry condition, and the obtained solid material was broken into pieces, then sieved using a sieve with a mesh size of 500 μm, and the obtained under powder was heated at 110° C. for 12 hours.

Next, the under powder was subjected to heat treatment at 1136° C. for 4 hours in a furnace in the air atmosphere, to obtain epsilon-type iron oxide magnetic particles coated with silicon oxide. Further, treatment of removing silicon oxide on the particle surface was performed by granulating the obtained heat-treated powder to 100 μm or less using a planetary ball mill, then adding 20 mass % NaOH, and stirring the mixture at about 70° C. for 24 hours, to obtain epsilon-type iron oxide magnetic particles of Example 5.

The particle size of the epsilon-type iron oxide magnetic particles according to Example 5 on number basis was as follows: the number average particle diameter of major diameters was 17.4 nm, and the 90% cumulative particle diameter (D90) of major diameters on number basis was 22.4 nm. Further, the standard deviation of major diameters was (nm) 3.90 nm, the variation coefficient of major diameters was 22%, and the geometric standard deviation σg was 1.29. Further, the average aspect ratio was 1.07, and σs/V (Am$^2$/kg·nm$^2$) was 0.005 (Am$^2$/kg·nm$^2$).

Example 6

4.18 g of ferric chloride.hexahydrate (FeCl$_3$.6H$_2$O) having a purity of 99 mass %), and 0.85 g of aluminum chloride hexahydrate (AlCl$_3$.6H$_2$O) having a purity of 98 mass % were dissolved in 21.43 g of pure water in 1 L reaction tank, while mechanically stirring with a stirring blade in the air atmosphere. The molar ratio of the metal ions in the charged solution was Fe:Al=1.630:0.370.

Next, 81.48 g of ethanol (special grade reagent: boiling point 78.37° C.) was added, then 45.89 g of TEOS (tetraethyl orthosilicate: Si (OC$_2$H$_5$)$_4$, ethyl silicate 28 manufactured by Colcoat Co., Ltd.) was added, then the mixture was stirred with a magnetic stirrer for 30 minutes. Then, the ratio of the number of moles of Si added as TEOS to the total number of moles (Fe+M) of metal ions in the charged solution was calculated. Si/(Fe+M) was found to be 11.7. Further, the ratio of the number of moles of added ethanol to the number of moles of added TEOS (organic solvent/TEOS) was calculated, and it was found to be 8.0.

Thereafter, the mixture with lost flowability was obtained, which was then dried at 65° C. for 14 hours under a dry condition, and the obtained solid material was broken into pieces, then sieved using a sieve with a mesh size of 500 μm, and the obtained under powder was heated at 110° C. for 12 hours, in the same manner as in Example 1 except that it was left standing at 30° C.

Next, the under powder was subjected to heat treatment at 1100° C. for 4 hours in a furnace in the air atmosphere, to obtain epsilon-type iron oxide magnetic particles coated with silicon oxide. Further, treatment of removing silicon oxide on the particle surface was performed by granulating the obtained heat-treated powder to 100 μm or less using a planetary ball mill, then adding 20 mass % NaOH, and stirring the mixture at about 70° C. for 24 hours, to obtain epsilon-type iron oxide magnetic particles of Example 6.

The particle size of the epsilon-type iron oxide magnetic particles according to Example 6 on number basis was as follows: the number average particle diameter of major diameters was 18.7 nm, and the 90% cumulative particle diameter (D$_{90}$) of major diameters on number basis was 22.1 nm. Further, the standard deviation of major diameters was (nm) 3.50 nm, the variation coefficient of major diameters was 19%, and the geometric standard deviation σg was 1.21. Further, the average aspect ratio was 1.05, and σs/V (Am$^2$/kg·nm$^2$) was 0.005 (Am$^2$/kg·nm$^2$).

Comparative Example 2

33.24 g of ferric nitrate (II) 9 hydrate (Fe(NO$_3$)$_3$·9H$_2$O)) having a purity of 99.7 mass %, 9.78 g of a Ga (III) nitrate solution having a Ga concentration of 13.20 mass %, 0.60 g of cobalt (II) nitrate hexahydrate having a purity of 97 mass %, and 0.84 g of titanium sulfate (IV) having a Ti concentration of 15.1 mass % were dissolved in 82.60 g of pure water in 1 L reaction tank, while mechanically stirring with a stirring blade in the air atmosphere. The molar ratio of the metal ions in this charged solution was Fe:Ga:Co:Ti=1.560: 0.350:0.040:0.050.

Next, 456.27 g of ethanol (special grade reagent: boiling point 78.37° C.) was added, then 256.96 g of TEOS (tetraethyl orthosilicate: Si (OC$_2$H$_5$)$_4$, ethyl silicate 28 manufactured by Colcoat Co., Ltd.) was added, and further 41.30 g of pure water was added, and then the mixture was stirred with a magnetic stirrer for 30 minutes. Then, the ratio of the number of moles of Si added as TEOS to the total number of moles (Fe+M) of metal ions in the charged solution was calculated. Si/(Fe+M) was found to be 11.7. Further, the ratio of the number of moles of added ethanol to the number of moles of added TEOS (organic solvent/TEOS) was calculated, and it was found to be 8.0.

Thereafter, the mixture with lost flowability was obtained, which was then dried at 65° C. for 14 hours under a dry condition, and the obtained solid material was broken into pieces, then sieved using a sieve with a mesh size of 500 μm, and the obtained under powder was heated at 110° C. for 12 hours, in the same manner as in Example 1 except that it was left standing at 60° C.

Next, the under powder was subjected to heat treatment at 1140° C. for 4 hours in a furnace in the air atmosphere, to obtain epsilon-type iron oxide magnetic particles coated with silicon oxide. Further, treatment of removing silicon oxide on the particle surface was performed by granulating the obtained heat-treated powder to 100 μm or less using a planetary ball mill, then adding 20 mass % NaOH, and stirring the mixture at about 70° C. for 24 hours, to obtain epsilon-type iron oxide magnetic particles of Example 3.

The particle size of the epsilon-type iron oxide magnetic particles according to Comparative Example 2 on number basis was as follows: the number average particle diameter of major diameters was 19.9 nm, and the 90% cumulative particle diameter (D90) of major diameters on number basis was 26.8 nm. Further, the standard deviation of major diameters was (nm) 7.91 nm, the variation coefficient of major diameters was 40%, and the geometric standard deviation σg was 1.46. Further, the average aspect ratio was 1.13, and σs/V (Am$^2$/kg·nm$^2$) was 0.002 (Am$^2$/kg·nm$^2$).

Table 3 summarizes the manufacturing conditions of each example and each comparative example. Further, Table 4 shows the results of each example and each comparative example.

TABLE 3

| | Production process | | | | | | | | | |
|---|---|---|---|---|---|---|---|---|---|---|
| | Charging composition (molar ratio) | | | | | Organic solvent | | Starting material (form of iron upon addition of TEOS) | Molar ratio of Si to metal in TEOS (Si/(Fe + M)) | Molar ratio of organic solvent to TEOS (organic solvent/TEOS) | Retention time upon gelation (° C.) |
| | Fe | Ga | Al | Co | Ti | Presence/absence | Kind | | | | |
| Example 1 | 1.55 | 0.35 | — | 0.05 | 0.05 | Present | Ethanol | Water soluble metal salt (nitrate) | 11.7 | 8.0 | 40 |
| Example 2 | 1.56 | 0.35 | — | 0.04 | 0.05 | Present | Ethanol | Water soluble metal salt (nitrate) | 11.7 | 8.0 | 40 |
| Example 3 | 1.56 | 0.35 | — | 0.04 | 0.05 | Present | Ethanol | Water soluble metal salt (nitrate) | 5.5 | 8.0 | 25 |

TABLE 3-continued

| | Charging composition (molar ratio) | | | | | Organic solvent Presence/absence | | Starting material (form of iron upon addition of TEOS) | Molar ratio of Si to metal in TEOS (Si/(Fe + M)) | Molar ratio of organic solvent to TEOS (organic solvent/TEOS) | Retention time upon gelation (° C.) |
|---|---|---|---|---|---|---|---|---|---|---|---|
| | Fe | Ga | Al | Co | Ti | | Kind | | | | |
| Example 4 | 1.45 | 0.55 | — | — | — | Present | Ethanol | Water soluble metal salt (nitrate) | 11.7 | 8.0 | 40 |
| Example 5 | 2.00 | — | — | — | — | Present | Ethanol | Water soluble metal salt (nitrate) | 5.5 | 7.4 | 25 |
| Example 6 | 1.63 | — | 0.37 | — | — | Present | Ethanol | Water soluble metal salt (chloride) | 11.7 | 8.0 | 30 |
| Comparative example 1 | 1.635 | 0.265 | — | 0.05 | 0.05 | Absence | — | Oxyhydroxide (containing substitutional element) | 2.8 | — | 30 |
| Comparative example 2 | 1.56 | 0.35 | — | 0.04 | 0.05 | Present | Ethanol | Water soluble metal salt (nitrate) | 11.7 | 8.0 | 60 |

TABLE 4

| | Epsilon-type iron oxide magnetic powder TEM observation | | | | | | | |
|---|---|---|---|---|---|---|---|---|
| | Average major diameter (nm) | 90% cumulative particle diameters of major diameters | 10% cumulative particle diameter of major diameters | Standard deviation of major diameters (nm) | Variation coefficient of major diameters (%) | Geometric standard deviation of major diameters | Harmonic average diameter of major diameters (nm) | Average aspect ratio |
| Example 1 | 17.7 | 22.2 | 12.2 | 3.59 | 20 | 1.24 | 17.0 | 1.05 |
| Example 2 | 17.6 | 20.8 | 12.5 | 3.34 | 19 | 1.22 | 16.9 | 1.06 |
| Example 3 | 19.0 | 23.0 | 13.2 | 4.05 | 21 | 1.23 | 18.2 | 1.06 |
| Example 4 | 17.7 | 22.0 | 11.7 | 4.16 | 23 | 1.28 | 16.7 | 1.06 |
| Example 5 | 17.4 | 22.4 | 11.4 | 3.90 | 22 | 1.29 | 16.3 | 1.07 |
| Example 6 | 18.7 | 22.1 | 13.3 | 3.50 | 19 | 1.21 | 18.0 | 1.05 |
| Comparative example 1 | 21.4 | 31.4 | 10.5 | 7.46 | 35 | 1.47 | 18.4 | 1.21 |
| Comparative example 2 | 19.9 | 26.8 | 11.6 | 7.91 | 40 | 1.46 | 17.8 | 1.13 |

| | Epsilon-type iron oxide magnetic powder | | | | | | |
|---|---|---|---|---|---|---|---|
| | TEM observation | | | Magnetization properties | | | |
| | Standard deviation of aspect ratio | Average particle volume V (cm$^3$) | Specific surface area BET (m$^2$/g) | Coercive force (Oe) | Coercive force (kA/m$^2$) | Saturation magnetization (Am$^2$/kg) | SQ | σ s/V (Am$^2$/kg · nm$^2$) |
| Example 1 | 0.07 | 2893.6 | 69.3 | 2497 | 199 | 17.5 | 0.53 | 0.006 |
| Example 2 | 0.06 | 2854.5 | 68.9 | 3390 | 270 | 16.7 | 0.57 | 0.006 |
| Example 3 | 0.07 | 3591.4 | 68.3 | 3374 | 268 | 17.5 | 0.55 | 0.005 |
| Example 4 | 0.06 | 2916.6 | 70.1 | 2945 | 234 | 10.7 | 0.49 | 0.004 |
| Example 5 | 0.08 | 2752.9 | 72.8 | 19268 | 1533 | 14.8 | 0.53 | 0.005 |
| Example 6 | 0.08 | 3415.0 | 66.8 | 15136 | 1204 | 15.5 | 0.54 | 0.005 |
| Comparative example 1 | 0.20 | 5131.4 | 57.5 | 3979 | 317 | 15.1 | 0.57 | 0.003 |
| Comparative example 2 | 0.22 | 4126.3 | 57.1 | 2394 | 191 | 10.0 | 0.47 | 0.002 |

In each example, magnetic powder having a narrow particle size distribution of epsilon-type iron oxide magnetic particles could be obtained, and σs/V (Am²/m²) was a good value.

Further, as shown in Table 4, in the epsilon-type iron oxide magnetic particles of each example, it is inferred that single nano-order level particles are reduced as compared with those of each comparative example, when considering the average major diameters, 90% cumulative particle diameters of major diameters, the 10% cumulative particle diameter of major diameters, the standard deviation of major diameters, the variation coefficient of major diameters, and the average aspect ratio, etc. When there are a plurality of single nano-order level particles, superparamagnetism may occur. If superparamagnetism occurs, the magnetism inherent to the epsilon-type iron oxide magnetic powder is not exhibited, which is not preferable. On the other hand, in each example, as described above, it is possible to provide a magnetic powder having a narrow particle size distribution of the epsilon-type iron oxide particles, thereby also making it possible to reduce the proportion of superparamagnetic particles, and as a result, σs/V (Am²/m²) shows a favorable value as compared with each comparative example.

INDUSTRIAL APPLICABILITY

The epsilon-type iron oxide magnetic powder containing the epsilon-type iron oxide particles according to the present invention has excellent particle size distribution, and therefore it is easy to be used as a magnetic material such as high density magnetic recording media, and it is useful from an industrial point of view, and it is also useful as a coating material containing epsilon oxide iron oxide particles, a magnetic recording medium, and a magnetic component.

The invention claimed is:

1. Epsilon-type iron oxide magnetic powder containing epsilon-type iron oxide particles having less than 35% variation coefficient of major diameters, wherein a 90% cumulative particle diameter (D90) of major diameters is 30 nm or less, and a geometric standard deviation (σg) of major diameters is 1.45 or less, which are obtained by transmission electron microscope observation.

2. The epsilon-type iron oxide magnetic powder according to claim 1, containing the epsilon-type iron oxide particles wherein an average aspect ratio obtained by transmission electron microscope observation is 1.1 or less.

3. The epsilon-type iron oxide magnetic powder according to claim 1, containing the epsilon-type iron oxide particles wherein a number average particle diameter of major diameters obtained by transmission electron microscopic observation is 10 nm or more and 20 nm or less.

4. A coating material containing the epsilon-type iron oxide magnetic powder of claim 1.

5. A magnetic recording medium containing the epsilon-type iron oxide magnetic powder of claim 1.

6. A magnetic component containing the epsilon-type iron oxide magnetic powder of claim 1.

7. The epsilon-type iron oxide magnetic powder according to claim 1, wherein at least a part of an iron site of the epsilon-type iron oxide magnetic particles is substituted.

8. The epsilon-type iron oxide magnetic powder according to claim 1, wherein when the epsilon-type iron oxide magnetic particles are spherically approximated, an average volume is 5000 nm³ or less.

9. A method for producing epsilon-type iron oxide magnetic powder, which produces the epsilon-type iron oxide magnetic powder according to claim 1, the method comprising:
mixing an aqueous solution containing a water-soluble iron salt or an aqueous solution containing the water-soluble iron salt and a salt of a metal element M other than iron, into a silicon compound having a hydrolyzable group, then keeping the mixture at 50° C. or less in stationary state, and obtaining a gel of silicon oxide containing the iron salt or silicon oxide containing the iron salt and the metal element M;
heating the gel of silicon oxide containing the iron salt or silicon oxide containing the iron salt and the metal element M, and obtaining a powder of epsilon-type iron oxide coated with silicon oxide; and
dissolving silicon oxide coating the epsilon-type iron oxide, and obtaining epsilon-type iron oxide magnetic powder.

10. The method for producing epsilon-type iron oxide magnetic powder according to claim 9, wherein the step of obtaining the gel of silicon oxide containing the iron salt or silicon oxide containing the iron salt and the metal element M further comprises: mixing an aqueous solution containing a water-soluble iron salt or an aqueous solution containing the water-soluble iron salt and a salt of a metal element M other than iron, into a water-soluble organic solvent, then mixing with the silicon compound having the hydrolyzable group, and keeping the mixture in a stationary state.

11. The method for producing epsilon-type iron oxide magnetic powder according to claim 9, wherein the iron salt is a nitrate or a chloride.

\* \* \* \* \*